Dec. 18, 1928.
A. M. MacFARLAND
1,695,694
AUTOMATIC ELECTRIC WELDING APPARATUS
Original Filed May 28, 1924    2 Sheets-Sheet 1
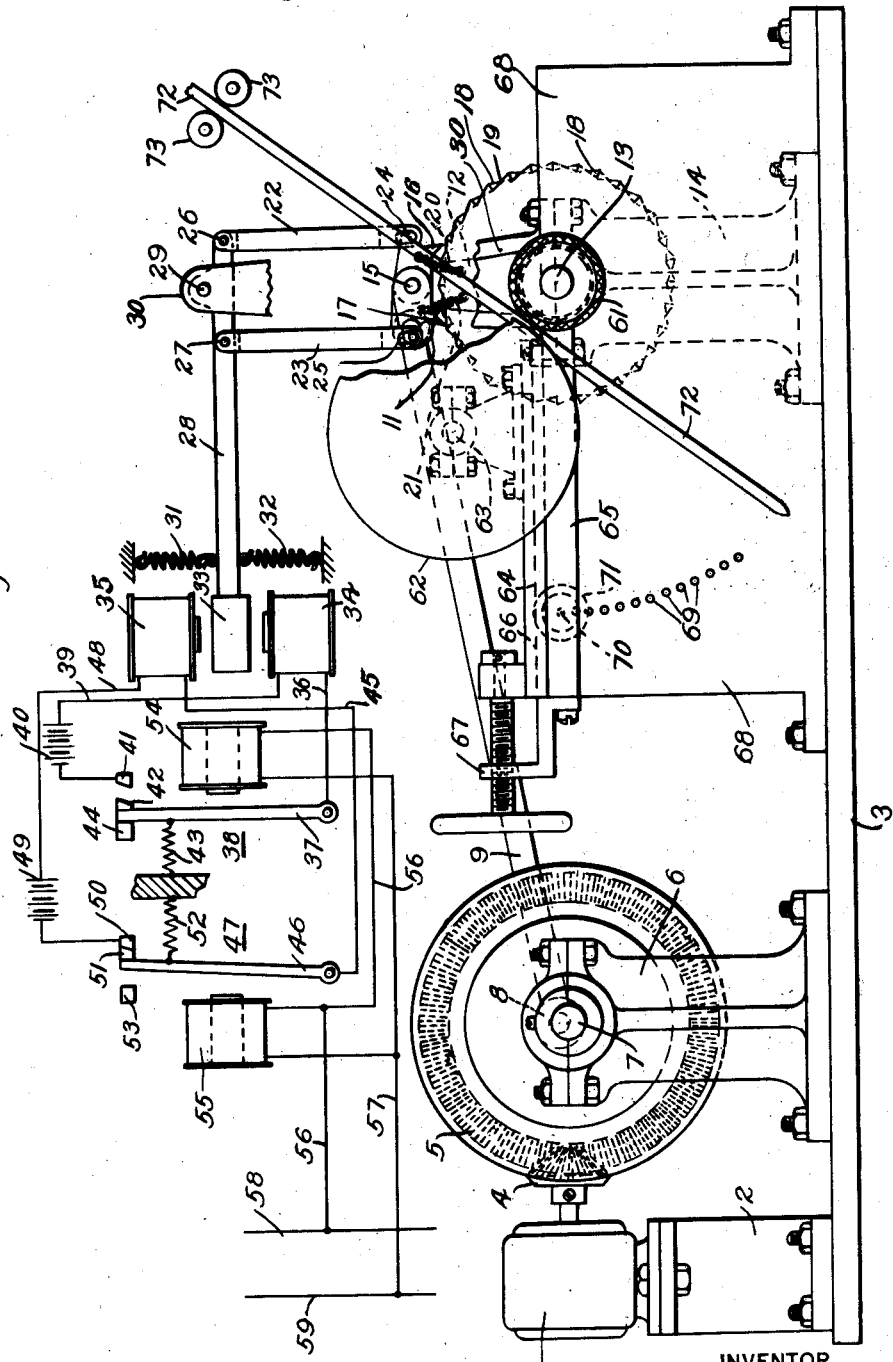
INVENTOR
Allis M. Mac Farland
BY
ATTORNEY Dec. 18, 1928.
A. M. MacFARLAND
1,695,694
AUTOMATIC ELECTRIC WELDING APPARATUS
Original Filed May 28, 1924   2 Sheets-Sheet 2
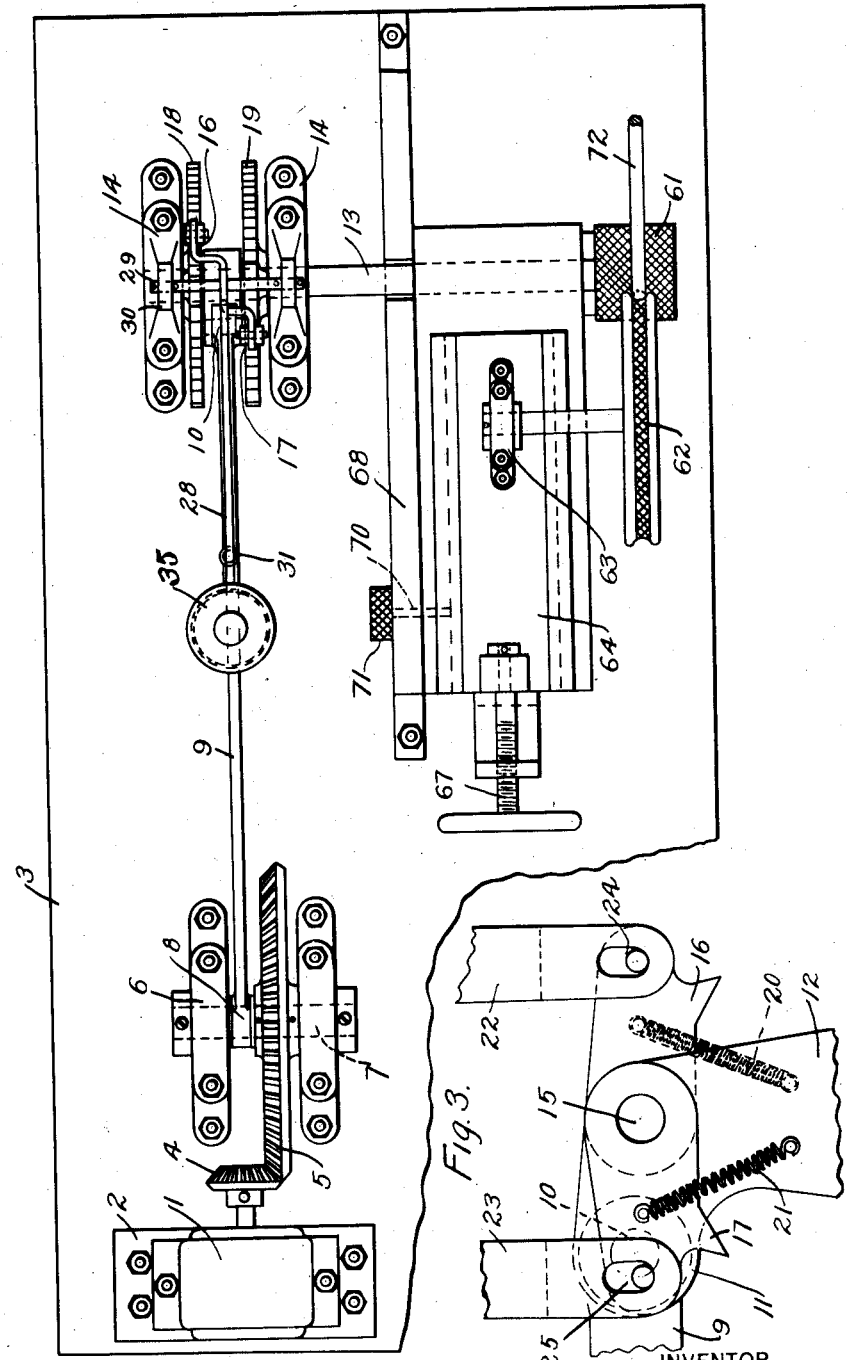
WITNESSES:
INVENTOR
Allis M. MacFarland
BY
ATTORNEY Patented Dec. 18, 1928.

1,695,694

UNITED STATES PATENT OFFICE.

ALLIS M. MacFARLAND, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC ELECTRIC WELDING APPARATUS.

Application filed May 28, 1924, Serial No. 716,290. Renewed November 3, 1928.

This invention relates to heating and welding apparatus, more particularly to a fusible electrode arc welding apparatus or to an arc furnace in which the electrode is fed to the work by automatic or semi-automatic means.

As is well known, it is desirable in welding with fusible metallic electrodes to maintain a short, substantially constant arc length which is so maintained in spite of the relatively rapid and variable fusing of the electrode. To accomplish this there have been proposed several types of apparatus in which the electrode is fed automatically to the arc which is intended to be maintained substantially constant.

A prior apparatus of this character included feed rolls between which the electrode was held, and a motor connected to the feed rolls to advance the electrode to the work. To control the arc length, the armature of the motor was placed in shunt with the arc in order that variations in arc length might cause corresponding variations in the speed of the motor and thus in the speed of the electrode, thereby maintaining the arc length substantially constant. In systems of this character, control of the motor speed might be obtained by various other means well known to the electrical engineer, such as the utilization of field windings in shunt with the arc, in series therewith, or combinations of shunt and series field windings and suitable armature connections. As a matter of fact, in such systems, the variations in speed of the motor are not wholly dependent upon variations in arc length by reason of the variations in the load imposed upon the motor, since the motor must perform a considerable amount of work in feeding and straightening the electrode.

Another system of a similar character which has been proposed included a solenoid in series with the arc and having a plunger operatively connected to a clutch arrangement which was directly connected to the feed rolls for the electrode. The action of the solenoid was opposed by a spring which tended to throw the clutch into the forward feeding position, this tendency being opposed by the action of the solenoid, which tended to throw the clutch into the reverse feeding position. In welding, it was intended that these two actions take place alternately to closely control the arc length, but it was found that the apparatus was very sensitive and required careful and exact adjustment of the spring which opposed the action of the solenoid. In addition thereto, various operating conditions caused variations in the action of the clutch arrangement.

The present invention is intended to obviate the difficulties encountered in prior devices of this type, it being among the objects thereof to provide an automatic welding system in which the action is positive and cannot change except by adjustment by the operator and in which the functioning of the control apparatus is not affected by variations in the load imposed upon the feed motor.

It is a further object of my invention to provide an apparatus which shall be relatively simple in construction, easy to operate and which shall be adapted to automatic or semi-automatic operation.

In practicing my invention, I provide a pair of feed rolls, between which the electrode is held, and a motor which is capable of feeding the said electrode, operatively connected thereto through a pawl and ratchet wheel arrangement which is caused to operate by fluctuations in conditions in the arc. Specifically, I provide two relays responsive to the voltage of the arc, each of the said relays being adapted to operate at a predetermined voltage or within a predetermined range of voltages. The action of the relays causes engagement or disengagement of a corresponding pawl and ratchet wheel, whereby the electrode is fed, either in a forward or in a reverse direction, as desired.

In the accompanying drawings, constituting a part hereof, and in which like reference characters indicate like parts,-

Figure 1 is an elevational view of my new apparatus;

Fig. 2 is a plan view thereof, and

Fig. 3 is an enlarged fragmentary view of the ratchet arrangement constituting an important part of my invention.

A motor 1 carried on a standard 2 secured to the base plate 3 of the apparatus, has a pinion 4 meshing with a gear 5 carried on a standard 6, which is also secured to the base 3. To the shaft 7 of the gear is rigidly secured an eccentric 8 having a connecting rod 9 pivoted thereon, the opposite end of said connecting rod being pivoted at point 10 of an arm 11, extending from a lever 12, which in turn is pivoted on a shaft 13 journaled on a standard 14.

Pivoted to the lever 12 at point 15 are two pawls 16 and 17, extending in opposite directions and intended to engage in a manner set forth below, with ratchet wheels 18 and 19, respectively, secured to shaft 13. Springs 20 and 21 secured to the pawls and to lever 12, tend to throw the pawls into engagement with the ratchet wheels. Arms 22 and 23 have slotted openings 24 and 25, respectively, pivoted to the free ends of pawls 16 and 17, respectively. The opposite ends, 26 and 27 thereof, are pivoted to an arm 28, which in turn is pivoted at point 29 intermediate the ends 26 and 27, to a fixed support 30. The arm 28 is biased by springs 31 and 32 in a neutral position, whereby the pawls 16 and 17 are held out of engagement with their respective wheels.

The free end of the arm 28 is provided with a soft iron armature 33 in alinement with solenoids 34 and 35 placed on opposite sides thereof. A lead 36 from solenoid 34 is connected to pivoted arm 37 of relay 38 and another lead 39 from solenoid 34, having a source of energy 40 in series therewith, is connected to contact 41 in cooperative relation with contact 42 on arm 37. A spring 43 normally biases arm 37 against insulating stop 44.

A lead 45 from relay 35 is connected to pivoted arm 46 of relay 47 and another lead 48 thereof, having a source of energy 49 in the circuit, is connected to contact member 50 in cooperative relation with contact member 51 of arm 46. A spring 52 normally biases arm 46 so as to cause engagement of contact members 50 and 51, and insulating stop 53 limits the motion of arm 46 when the spring 52 is overbalanced by the energization of the relay coil.

The relays 38 and 47 are provided with coils 54 and 55, respectively, adapted to attract arms 37 and 46 thereof and connected in parallel by leads 56 and 57 across the lines 58 and 59, respectively, of the source of welding current.

On the shaft 13 is rigidly secured a knurled wheel 61 which is in operative engagement with a grooved wheel 62 pivoted in bearing 63 carried by a table 64 on a support 65, the said table and support having a tongue-and-groove arrangement 66 to allow the table to be moved relatively to the support by screw arrangement 67, in order to adjust the relative positions of wheels 61 and 62.

A plate 68 secured to base 3 has a series of openings 69 in a radius with shaft 13 as its center and support 65 has a similar opening 70. A pin 71 passing through plate 68 is adapted to engage opening 70 and any one of openings 69, whereby the table 64 and its support may be moved into a plurality of positions in order to vary the angle of the electrode 72, which is held between wheels 61 and 62. If desired, straightening rolls 73 operated by any suitable means to straighten the wire electrode as it comes from a reel or other source of supply, may be provided. The work operated on may be of any suitable character and may be moved with relation to the electrode in any suitable manner (not shown) as is common in the prior art.

The operation of my device is as follows: Assume that relay 38 is set to close its contacts 41 and 42 when the welding voltage rises as high as 13 or 15 volts, and relay 47 is set to close its contacts 50 and 51 when the welding voltage drops as low as 5 or 7 volts. When the welding circuit is energized, relay 38 will close contacts 41 and 42, thus energizing solenoid 34 and causing armature 33 thereof to be drawn downwardly. This action causes a lowering of arm 23, allowing pawl 17 to come into engagement with its ratchet wheel 19.

Previously, motor 1 has been set in operation, causing rapid reciprocation of connecting arm 9 and of pawls 16 and 17. The rate of movement of the pawls is so rapid that if they were in operation continuously, the rate of electrode feed, either forwardly or in reverse, would be several times too great. Therefore, for a major portion of the time, the pawls are out of engagement with their respective wheels.

Upon the engagement of pawl 17 and wheel 19, the electrode 72 is fed to the work until it is substantially in contact therewith, thereby causing current to flow therethrough and reducing the voltage of the arc to such an extent that relay 38 releases and the contacts 50 and 51 of relay 47 are closed, thereby de-energizing solenoid 34 and energizing solenoid 35, respectively. This causes an upward movement of armature 33, the disengagement of pawl 17 and the engagement of pawl 16 with its wheel 18. The wheel 18 is caused to rapidly retract electrode 72, thereby striking an arc between the electrode and the work. Although, as I have set forth above, my system may be used to initiate the arc, other means for accomplishing this may be used.

After the arc has been established, the electrode rapidly burns away, increasing the voltage of the arc until it reaches 13 to 15 volts, whereby relay 38 is once more energized to feed the electrode to the work. When the arc becomes too short and the voltage has dropped to 5 to 7 volts, the reversing mechanism again operates to retract the electrode. These actions take place in rapid succession and in variable order, the net result being that the voltage of the arc and the arc length are kept sufficiently constant for good welding.

It will be noted that the relays which I have provided are not sensitive to all the variations in arc length and, therefore, arc voltage, but are set to operate after a predetermined change in arc voltage has taken place. Thereby the action of the relays and the resulting feed of the electrode always takes place under exactly the same conditions, and the feed of the electrode is, therefore, exactly in accordance with changes in the arc length and is in no manner even partially dependent upon other and undesirable variations.

Although I have described my invention setting forth a single embodiment thereof, it is apparent that various changes therein may be made within the scope of my invention. For instance, I may substitute for the motor, some other motor device such as an electro-magnet or the like. The pawls which operate the ratchet wheels may be carried on a single arm, as shown, or may be carried by separate arms, controlled by a motor device which may be common to both or may be independent. In order to prevent any possibility of the electrode freezing to the work, I may make the reversing speed much greater than the forward speed, which may be accomplished by various means, such as providing a smaller ratchet wheel and utilizing a separate connecting rod for its pawl. Although I prefer to utilize changes in the voltage of the arc to actuate the relays, I may utilize the current through the arc or a combination of the current and the voltage of the arc to control the operation thereof.

In some instances, in order to provide a semi-automatic welding device or a portable apparatus, it may be sufficient to have but a single relay and a single ratchet mechanism which will feed the electrode to the work, dispensing with the reversing mechanism. Also, in some cases it may be desirable to have an additional relay which shall operate at a very low voltage to start the arc or to compensate for a sharp rise in the work which passes across the arc. An arrangement of this character will prevent, in all cases, the remote possibility of the freezing of the electrode to the work.

The relays may be made sensitive to other ranges of voltage than those set forth above. The suggested values show the lowest values actually used and indicate the sensitivity of this form of arc regulating means. As it is the usual practice in the art to employ somewhat higher average voltages, the voltage settings for the relays will be somewhat greater, for most purposes, than the values given in the illustration.

It is not essential or desirable that the relays be in proximity to the welding apparatus, but the same may be mounted upon the control panel of the apparatus. The means, which I have shown, for the adjustment of the angle of the electrode and of the distance between the wheels 61 and 62 may be omitted or may be of different construction. These and other changes may be made in my invention without departing from the spirit and scope thereof.

I claim as my invention:

1. In an arc welding system including a fusible metal electrode, means for feeding the same to the work comprising a substantially constant speed motor device, a mechanism including a reciprocating element actuated by said device operatively connected to said electrode and means responsive to conditions in the arc for controlling the movement of the mechanism and electrode.

2. In an arc welding system including a fusible metal electrode, means for feeding the same to the work comprising a substantially constant speed motor device, a mechanism including a plurality of reciprocating elements actuated by said device operatively connected to said electrode and means responsive to conditions in the arc for controlling the movement of the mechanisms and electrode.

3. In an arc welding system including a fusible metal electrode, means for feeding the same to the work comprising a substantially constant speed motor device, a plurality of ratchet mechanisms for feeding said electrode in opposite directions adapted to be actuated by said device operatively connected to said electrode and means responsive to conditions in the arc for controlling the movement of the mechanisms and electrode.

4. In an arc welding system including a fusible metal electrode, reciprocating means for feeding the same to the work comprising a substantially constant speed motor device, a ratchet wheel operatively connected to said electrode, a pawl actuated by said device and means for intermittently causing said pawl to engage said wheel.

5. In an arc welding system including a fusible metal electrode, reciprocating means for feeding the same to the work comprising a substantially constant speed motor device, a ratchet wheel operatively connected to said electrode, a pawl actuated by said device and a relay responsive to conditions in the arc for intermittently causing said pawl to engage said wheel.

6. In an arc welding system including a fusible metal electrode, reciprocating means for feeding the same to the work comprising a substantially constant speed motor device, a ratchet wheel operatively connected to said electrode, a pawl therefor, an eccentric and rod connecting said device and pawl, and means for intermittently causing said pawl to engage said wheel.

7. In an arc welding system including a fusible metal electrode, means for feeding the same to the work comprising a substantially constant speed motor device, a plurality of ratchet wheels operatively connected to said electrodes for feeding the same in opposite directions, a plurality of pawls continuously actuated by said device and means for intermittently causing said pawls to engage said wheels.

8. In an arc welding system including a fusible metal electrode, means for feeding the same to the work comprising a substantially constant speed motor device, a plurality of ratchet wheels operatively connected to said electrode, a plurality of pawls actuated by said device and means responsive to conditions in the arc for intermittently causing said pawls to engage said wheels.

9. In an arc welding system including a fusible metal electrode, means for feeding the same to the work comprising a substantially constant speed motor device, a plurality of ratchet wheels operatively connected to said electrode, pawls therefor, an eccentric and rod connecting said device and pawls and means for intermittently causing said pawls to engage said wheels.

10. In an arc welding system including a fusible metal electrode, means for feeding the same to the work comprising a substantially constant speed motor device, a plurality of ratchet wheels operatively connected to said electrode, pawls therefor, an eccentric and rod connecting said device and pawls and means for intermittently causing said pawls to engage said wheels including a plurality of relays responsive to conditions in the arc.

11. In an arc welding system including a fusible metal electrode, means for feeding the same to the work comprising a substantially constant speed motor device, a plurality of ratchet wheels operatively connected to said electrode, pawls therefor, an eccentric and rod connecting said device and pawls and means for intermittently causing said pawls to engage said wheels including a plurality of relays of different sensitiveness responsive to conditions in the arc.

12. An electric arc device comprising a consuming electrode, a source of energy for the arc, an independently energized feeding mechanism adapted, when rendered effective, to feed said electrode toward the work in a succession of short, intermittent steps, and electro-responsive means for rendering said mechanism effective in accordance with an electrical quantity in the arc circuit.

13. An electric arc device comprising a consuming electrode, a feeding mechanism adapted, when energized, to feed said electrode toward the work in a succession of short, intermittent steps, retracting mechanism adapted, when energized, to move said electrode away from the work in a succession of short, intermittent steps, and means for energizing said feeding and retracting mechanisms in accordance with electrical conditions obtaining in the arc circuit.

14. An electric arc device comprising a consuming electrode, a source of energy for the arc, an independently energized feeding mechanism operative to feed said electrode toward the work in a succession of short, intermittent steps at a predetermined resultant or integrated speed in excess of the rate of consumption of the electrode, and electro-responsive means for controlling the operation of said feeding mechanism in accordance with the condition of the arc.

15. An electric arc device comprising a consuming electrode, feeding mechanism operative to feed said electrode toward the work in a succession of short, intermittent steps at a predetermined resultant or integrated speed in excess of the rate of consumption of the electrode, retracting mechanism operative to move said electrode away from the work in a succession of short, intermittent steps at a predetermined resultant or integrated speed, and electro-responsive means for controlling the operation of said feeding and retracting mechanisms in accordance with the condition of the arc.

16. An electric arc device comprising a consuming electrode, a continuously operating reciprocating power mechanism, means adapted, when actuated, to cause only the forward movement of said reciprocating mechanism to be effective for feeding said electrode toward the work in a succession of short, intermittent steps at a resultant or integrated speed in excess of the rate of consumption of the electrode, and a device for controlling the actuation of said means.

17. An electric arc device comprising a consuming electrode, a continuously operating reciprocating power mechanism, means adapted, when actuated, to cause only the forward movement of said reciprocating mechanism to be effective for feeding said electrode toward the work in a succession of short, intermittent steps at a resultant or integrated speed in excess of the rate of consumption of the electrode, other means adapted, when actuated, to cause only the backward movement of said reciprocating mechanism to be effective for moving said electrode away from the work in a succession of short, intermittent steps at a predetermined resultant or integrated speed, and a device for controlling the actuation of both of said means.

18. An electric arc device comprising a consuming electrode, a continuously operating reciprocating power mechanism, a feeding roller in engagement with said electrode, a ratchet mechanism associated with said feeding roller, a pawl secured to said reciprocating mechanism and yieldably engaging said ratchet mechanism, and electro-responsive means for, at times, disengaging said pawl from said ratchet mechanism in accordance with the condition of the arc.

19. An electric arc device comprising a consuming electrode, a continuously operating reciprocating power mechanism, a feeding roller in engagement with said electrode, a ratchet mechanism associated with said feeding roller, a pair of oppositely directed pawls secured to said reciprocating mechanism and yieldably engaging said ratchet mechanism, and electro-responsive means for, at times, disengaging the respective pawls from said ratchet mechanism in accordance with the condition of the arc.

20. An electrode feeding system comprising a continuously reciprocating power device, an electrode gripping device and means for making and breaking a mechanical connection between said reciprocating device and said gripping device.

21. In an arc welding system, the combination with a fusible metal electrode, of means for feeding the same to the work comprising a substantially constant-speed-motor device, a ratchet mechanism operatively connected to said electrode for feeding the same in either direction, a plurality of pawls continuously reciprocated by said device and means for causing only one of said pawls to continuously engage said ratchet mechanism at times.

In testimony whereof, I have hereunto subscribed my name this 21st day of May, 1924.

ALLIS M. MacFARLAND.